US011383375B2

(12) United States Patent
Freundt (10) Patent No.: US 11,383,375 B2
(45) Date of Patent: Jul. 12, 2022

(54) POSITIONING UNIT (71) Applicant: Manz AG, Reutlingen (DE)

(72) Inventor: Martin Freundt, Esslingen (DE)

(73) Assignee: Manz AG, Reutlingen (DE)

(*) Notice: Subject to any disclaimer, the term of this patent is extended or adjusted under 35 U.S.C. 154(b) by 469 days.

(21) Appl. No.: 16/475,190

(22) PCT Filed: Dec. 21, 2017

(86) PCT No.: PCT/EP2017/084202
§ 371 (c)(1),
(2) Date: Jul. 1, 2019

(87) PCT Pub. No.: WO2018/122118
PCT Pub. Date: Jul. 5, 2018

(65) Prior Publication Data
US 2019/0337147 A1 Nov. 7, 2019

(30) Foreign Application Priority Data
Jan. 2, 2017 (EP) .................................. 17150050

(51) Int. Cl.
B25J 9/00 (2006.01)
B23Q 1/60 (2006.01)
(Continued)

(52) U.S. Cl.
CPC ............ *B25J 9/0033* (2013.01); *B23Q 1/608* (2013.01); *F16H 21/46* (2013.01); *F16H 25/02* (2013.01); *B25J 17/0275* (2013.01); *F16M 11/06* (2013.01)

(58) Field of Classification Search
CPC ..... B25J 9/0033; B25J 17/0266; B23Q 1/608; B23Q 1/5462; F16M 11/06
See application file for complete search history.

(56) References Cited

U.S. PATENT DOCUMENTS 5,378,282 A * 1/1995 Pollard ................... F16H 25/02
901/29
5,916,328 A * 6/1999 Pritschow ............ B23Q 1/5462
901/29
(Continued)

FOREIGN PATENT DOCUMENTS

CN 1486236 A 3/2004
CN 105904448 A 8/2016
(Continued)

OTHER PUBLICATIONS

English translation of the International Preliminary Report on Patentability and Written Opinion of the International Searching Authority in PCT/EP2017/084202, dated Jul. 11, 2019.
(Continued)

Primary Examiner — Randell J Krug
(74) Attorney, Agent, or Firm — Collard & Roe, P.C.

(57) ABSTRACT

A positioning unit includes two control carriages and a work carriage, it being possible to move the two control carriages and the work carriage on tracks that extend in parallel with one another. There is a working arm being articulated on a work base point on the work carriage and a control arm being articulated on a control base point on each of the control carriages. The control arms are articulated on the working arm at a control point of the working arm, the control point being spaced apart at a predefined lambda distance (d) from an end of the working arm that forms a working-point end and faces away from the work base point, and the two control base points and the work base point defining a triangle. At least two carriages of the two control carriages and the work carriage are movably arranged on a shared guide.

14 Claims, 5 Drawing Sheets (51) Int. Cl.
  *F16H 21/46* (2006.01)
  *F16H 25/02* (2006.01)
  *B25J 17/02* (2006.01)
  *F16M 11/06* (2006.01)

(56) References Cited

U.S. PATENT DOCUMENTS

| | | | | |
|---|---|---|---|---|
| 6,099,217 | A * | 8/2000 | Wiegand | B23Q 17/22 901/41 |
| 6,402,444 | B1 * | 6/2002 | Wang | B23Q 1/601 74/490.1 |
| 6,974,297 | B2 * | 12/2005 | Brog | B25J 17/0266 901/29 |
| 6,976,821 | B2 | 12/2005 | Zarske | |
| 7,909,303 | B2 * | 3/2011 | Bergmann | B23Q 1/5462 248/661 |
| 8,303,238 | B2 * | 11/2012 | Thurneysen | B23Q 1/5462 901/29 |
| 9,045,291 | B2 * | 6/2015 | Konrad | B65G 47/34 |
| 2021/0060763 | A1 * | 3/2021 | Xu | B23Q 1/44 |

FOREIGN PATENT DOCUMENTS

| | | | |
|---|---|---|---|
| DE | 195 25 482 A1 | 1/1997 | |
| DE | 19525482 A1 * | 1/1997 | ........... B23Q 1/4861 |
| DE | 100 19 162 A1 | 10/2001 | |
| DE | 102013206125 A1 * | 10/2014 | ........... B65G 47/901 |
| EP | 2 105 264 A1 | 9/2009 | |
| JP | H01-252379 A | 10/1989 | |
| WO | 99/32256 A1 | 7/1999 | |

OTHER PUBLICATIONS

International Search Report of PCT/EP2017/084202, dated Mar. 28, 2018.

European Office Action dated Jul. 3, 2017 in European Application No. 17150050.7 with English translation of relevant parts.

Chinese Office Action dated Mar. 3, 2022 in Chinese Application No. 201780081978.7 with English translation.

* cited by examiner

POSITIONING UNIT

CROSS REFERENCE TO RELATED APPLICATIONS

This application is the National Stage of PCT/EP2017/084202 filed on Dec. 21, 2017, which claims priority under 35 U.S.C. § 119 of European Application No. 17150050.7 filed on Jan. 2, 2017, the disclosures of which are incorporated by reference. The international application under PCT article 21(2) was not published in English.

The invention relates to a positioning unit comprising two control carriages and a work carriage,
   it being possible to move the two control carriages and the work carriage on tracks that extend in parallel with one another,
   a working arm being articulated on a work base point on the work carriage and a control arm being articulated on a control base point on each of the control carriages,
   the control arms being articulated on the working arm at a control point of said working arm, the control point being spaced apart at a predefined lambda distance d from an end of the working arm that forms a working-point end and faces away from the work base point, and
   the two control base points and the work base point defining a triangle.

A positioning unit of this kind is known from U.S. Pat. No. 5,378,282 A.

The positioning unit described therein is disadvantageous in that the realization requires a relatively high design effort, which is associated with high manufacturing costs. This applies all the more as more degrees of freedom or axes are realized by means of the principle described therein.

The object of invention is therefore that of improving a generic positioning unit.

The object is achieved by a positioning unit comprising two control carriages and a work carriage,
   it being possible to move the two control carriages and the work carriage on tracks that extend in parallel with one another,
   a working arm being articulated on a work base point on the work carriage and a control arm being articulated on a control base point on each of the control carriages,
   the control arms being articulated on the working arm at a control point of said working arm, the control point being spaced apart at a predefined lambda distance d from an end of the working arm that forms a working-point end and faces away from the work base point, and
   the two control base points and the work base point defining a triangle,
   wherein at least two carriages of the two control carriages and the work carriage being movably arranged on a shared guiding means.

Therefore, the same guiding means can be used for a plurality of carriages. Material can thus be saved by design. For a large number of movements that can be performed using the positioning unit, a plurality of carriages can move in opposite directions. In these cases, the impulses caused by the carriages can compensate for one another. The overall speed at which the positioning unit is operated can therefore be increased.

In particular, the two control carriages and the work carriage can be movably arranged on a shared guiding means.

The guiding means can have a guide rail, for example. The two control carriages and/or the work carriage can be movably arranged on said guide rail. Alternatively, one of the two control carriages and the work carriage can also be movably arranged on the guide rail.

The guiding means can also have more than one guide rail. For example, the guiding means can be formed from at least two interconnected guide rails. The guiding means can then be prefabricated from the individual guide rails and subsequently installed in the positioning unit more easily. Control and/or work carriages can also engage at a plurality of guide rails, as a result of which the stability of the positioning unit can be improved. For example, two of the three carriages, in particular the two control carriages, can be movably arranged on an upper guide rail, and the third carriage, in particular the work carriage, can be movably arranged on a lower guide rail.

The guiding means can also be formed from a preferably elongate part, for example a motor component or a part of a measuring system, that is shared by at least two carriages. The guiding means can be formed in particular by a stator of a linear motor.

The lambda distance d can be at least 10% of the entire length of the working arm. The lambda distance d can be at least as long as a control arm, preferably at least as long as the longest control arm when there are control arms of different lengths. Thus, a working space of the positioning unit can be used or reached by the positioning unit as far as the end of the guiding means.

The work base point can be arranged on a base plate of the work carriage. The base plate can be arranged for example on the work carriage. Alternatively, the base plate can also be formed by the work carriage. It is then particularly easy to ensure that the two control base points and the work base point define a triangle at all times or in every position of the control carriages and the work carriage. In particular, the work base point on the base plate of the work carriage can be arranged outside a connecting line of the control base points for this purpose.

The positions of the work base point on the base plate and/or of the control base points can also be selected on the basis of forces or moments that arise and/or are to be expected.

It is also conceivable for plates to also be arranged on or formed by one or more control carriages instead of or in addition to the base plate of the work carriage. The plates or respectively the base plates can be movably arranged directly or indirectly on a plurality of guide rails in order to further improve the stability of the positioning unit.

A work unit can also be arranged on the working-point end of the working arm.

The work unit can also be or have a holder, for example. For example, the holder can be a tool holder. The work unit can also have or be designed as a tool or a tool component. For example, a laser machining component, in particular a laser machining head, and/or a gripping device can be provided as a work unit.

In addition, a support arm, preferably a first and a second support arm, that is supported at least indirectly on the guiding means can be connected to, preferably articulated on, the working-point end of the working arm and/or the work unit.

For example, the support arm can additionally support the work unit. For this purpose, the support arm can likewise be articulated, at the other end thereof, on the work carriage and/or on the base plate of the work carriage. It is particularly advantageous that the support arm is arranged so as to be movable relative to at least one other carriage. In particular, the support arm can be movably arranged on the guiding means by means of a support carriage.

It is particularly advantageous if the first and the second support arm form a parallelogram mechanism. This can ensure that the work unit maintains a constant orientation relative to the guiding means or to a guide rail of the guiding means.

A plurality of support arms on a plurality of support carriages can also be movably arranged on the guiding means. It is thus possible to control more than three axes by means of the positioning unit. In particular, positioning units having four, five or six axes can therefore be produced particularly easily by adding additional support arms, for example.

It is also conceivable for the support arm to be designed as a flexible tension element, preferably as a metal strip. The flexible tension element can be designed as a strip, in particular as a strip consisting of elastically deformable material, or as a traction rope. The flexible tension element can be a spring steel strip, for example. In general, the flexible tension element can advantageously be made of a material that is rigid, in particular elastically deformable in angular movements. It is also conceivable for the support arm to be designed as a pressure-resistant strip.

Owing to a flexible tension element of this kind, the number of joints necessary is reduced, as a result of which cost advantages can also be realized. It is particularly favorable to provide a flexible tension element of this kind if comparatively few movements, relative to other joints, are to be expected. It can be exploited that such a flexible tension element as well as the support arms can be subjected to tensile loading. If at least two support arms are designed as flexible tension strips, a parallelogram mechanism comprising said strips can be produced particularly inexpensively. It is also possible to design arms other than the support arm as a flexible tension element. For example, it is conceivable to design one or more of the control arms as a flexible tension element. In particular, it is conceivable to replace an arm with two flexible tension elements, the compression forces being diverted to another arm, for example the working arm.

At least two carriages can be arranged on a base carriage, the at least two carriages being movable relative to one another. For example, the two control carriages and the work carriage can be arranged on a shared base carriage. The base carriage can also be formed by one of the carriages, and another carriage can be arranged on said base carriage so as to be movable relative to the base carriage. It is thus possible to move the base carriage along the guiding means and therefore cover a particularly large working space of the positioning unit. Moving the appropriate carriage or carriages relative to the base carriage is thus sufficient for precisely positioning the work end or the work unit. For example, this allows for a transport system that provides a powerful drive for the base carriage in order to convey transport goods over a long distance. The transport goods can be precisely positioned, for example along additional axes, by means of weaker, but more inexpensive drives of the corresponding carriages.

It is also conceivable for the positioning unit to have an impulse decoupling unit, in particular for decoupling or respectively compensating for a recoil impulse. For example, the impulse decoupling unit is designed for decoupling or respectively compensating for recoil impulses from at least one control and/or work carriage and from masses arranged thereon, or is designed for decoupling the respective counterparts which the carriage or carriages abuts or abut in each case for acceleration. Recoil impulses that arise as a result of accelerations of the carriages or of the masses arranged on said carriages and would otherwise be transferred to the surroundings can be considerably reduced by an impulse decoupling unit of this kind. The loading of in particular a stand that supports the positioning unit can therefore be reduced. The positioning unit can also be operated by means of further increased accelerations and/or improved jerk values.

It is also conceivable for the positioning unit to have a, preferably adjustable, weight compensation unit. The weight compensation unit can for example be designed to compensate for weight forces of the carriages and/or the work unit. The weight compensation unit can have a spring element. The weight compensation unit can also have a hydraulic or pneumatic system.

It is particularly preferable for the weight compensation unit to be adjustable such that the weight compensation unit can be adapted for example to different work units or masses thereof.

It is also conceivable for at least one articulation to be formed by means of a preloaded, i.e. zero-clearance, bearing. At least one additional bearing point and/or a guiding component, for example a guide rail, of the positioning unit can also have zero clearance, as a result of which the positioning accuracy of the positioning unit can be further improved.

An articulation should be understood in each case to mean a device by means of which an articulated element of the positioning unit is articulated on another, corresponding element of the positioning unit. In particular, the articulations can be joints of the positioning unit. The precision of the positioning unit by means of which the work end or the work unit can be positioned can be further improved as a result of the zero-clearance bearing action. Particularly preferably, an articulation can be formed by means of a cross roller bearing, in particular a zero-clearance, preloaded cross roller bearing. A cross roller bearing can also safely absorb transverse forces and moments with zero clearance.

At least one carriage can be movable by means of a linear motor, the current-carrying motor part (of the movable rotor) of the linear motor preferably being arranged on the carriage. A linear motor allows for particularly quick and precise movements. The linear motor can be designed as a synchronous motor or as an asynchronous motor.

It is conceivable that a currentless stator of the linear motor, designed for example as a magnetic rail having magnetic regions of alternating directions of polarization, is arranged in parallel with the guiding means. In particular, the currentless stator of the linear motor can extend along the guiding means. In other words, the extension of the currentless stator of the linear motor can be selected according to the length of the guiding means. Advantageously, the or a guide rail of the guiding means can be designed as a currentless stator or the stator can be integrated into the guiding means. This also reduces the material cost by design.

However, it is also conceivable to alternatively supply current to the stator or respectively the stationary motor part of the linear motor instead of to the movable rotor. This allows flexibly deformable energy supply means for supplying current to the movable rotor to be dispensed with.

At least two carriages can share a component of the positioning unit, for example are movable by means of a shared motor component. For example, at least two carriages can be movable by means of a linear motor, it being possible to use one part of the linear motor multiple times. In the case of a plurality of carriages, in particular the respective current-carrying motor parts can interact with the same currentless stator. The currentless stator can therefore be used multiple times and, at the same time, a particularly large working space that can be used by the positioning unit can be provided. Additional material savings can thus be made.

Since substantially only the current-carrying motor parts of the linear motors are to be moved, the moved mass can be reduced considerably. This allows the speed and/or dynamics of the positioning unit to be further increased.

Additional components can also be shared. For example, magnetic strips that can in particular be shared can be provided on the currentless stator. For example, material measures or position sensors, in particular for determining the position of a carriage, can also be arranged along the guiding means or along the currentless stator and can be used for example to detect the position of the different carriages, and can therefore be used multiple times. Electrical or signal lines can also be shared.

In addition, the current supplies of the current-carrying motor parts can be supplied with current by flexible energy supply means. For example, a main cable carrier can lead to the work carriage and a small cable carrier can lead from the work carriage to another carriage.

It is also conceivable to arrange power amplifiers for current-carrying motor parts, such as coils, on the corresponding carriage.

It is further conceivable for at least one carriage to be driven for example pneumatically or hydraulically. In general, different carriages can be driven by different drives.

One carriage, for example the base carriage, can also be driven by a toothed belt, as a result of which the mass to be moved for driving the base carriage can be minimized. Toothed racks or spindles, in particular those having a wide pitch, can also be provided instead of or in addition to toothed belts.

A toothed belt of this kind can also be shared by at least two carriages.

It is also conceivable for the positioning unit to have a control unit that is preferably designed as a computer unit and is designed to move the control and/or work carriages along the guiding means such that the working-point end reaches a predefinable spatial position within a working space of the positioning unit. For this purpose, the control unit can have a computer program component that converts a predefined position that is given for example in Cartesian coordinates, to which the work unit or the work end is intended to be moved, into end positions to which the respective carriages are to be moved. The control unit can also be designed to precalculate and generate control pulses from the corresponding actual position of the corresponding carriages and the corresponding end position of the corresponding carriages, through which the carriages can subsequently be moved into the respective end positions.

It is also conceivable for at least one of the arms to be adjustable in length. For example, a control arm can be adjustable in length. The length adjustment of the arm that is adjustable in length can be driven by a motor. This allows the speed at which a specified position of the work end or the work unit can be approached to be further increased. This also allows the work region that can be covered by the positioning unit to be further enlarged or the configuration of the system to be adapted to an alternative work point. What is known as a lambda kinematic system, is formed by the articulation of the control arms at a control point that is spaced apart from the working-point end at the predefined lambda distance d, together with the working arm. In particular, a lambda kinematic system with three or more dimensions can be formed by the corresponding number of axes or carriages being provided. The articulation sensitivity by means of which the control arms control the working arm can be set by the selection of the lambda distance d. Therefore, according to a particularly advantageous embodiment of the invention, the control point can be moved along the working arm in a presettable manner. For example, joints by means of which the control arms are articulated on the working arm at the control point can be interconnected by means of a shared adjusting element. For this purpose, the adjusting element can be arranged so as to be movable along the working arm. For example, the adjusting element can have an internal thread that engages in a spindle thread that extends along the working arm over a region thereof and can be moved thereon by being rotated.

A plurality of elements of the positioning unit, in particular the carriages, can be assembled in a similar or identical manner. This allows for larger quantities of identical or similar elements to be installed in the positioning unit, as a result of which costs can be further reduced owing to economies of scale. In particular, the positioning unit can be constructed as a modular system. Individual elements of the positioning unit can be produced in a standardized manner for this purpose. In particular, a plurality of articulations can also be realized by means of identical joints.

According to the application or the field of use of the positioning unit, a low construction height can be achieved at least with respect to an axial direction. This allows the accessibility of the working space to be expanded or improved.

A plurality of positioning units can also be provided which work in the same and/or in overlapping working spaces. The positioning units can be arranged in particular above one another, adjacent to one another, at an angle to one another, e.g. in an L-shape or with a passage, or opposite one another. If they are arranged above or adjacent to one another, a plurality of positioning units can share the same guiding means, as a result of which additional cost savings are made.

A plurality of positioning units can use the same guiding means, in particular carriages of different positioning units can be movable along the same guiding means. For some applications, carriages may be movable in a mutually overlapping, but microscopically independent manner.

The positioning unit according to the invention can be used in particular in handling systems, processing machines, for example laser processing machines, insertion machines and the like.

Additional features and advantages of the invention can be found in the following detailed description of embodiments of the invention, on the basis of the drawings, which show details essential to the invention, and in the claims.

The individual features may each be implemented in isolation or together in any desired combinations in variants of the invention.

Embodiments of the invention are shown in the schematic drawings and are explained in further detail in the following description.

Figure 1:
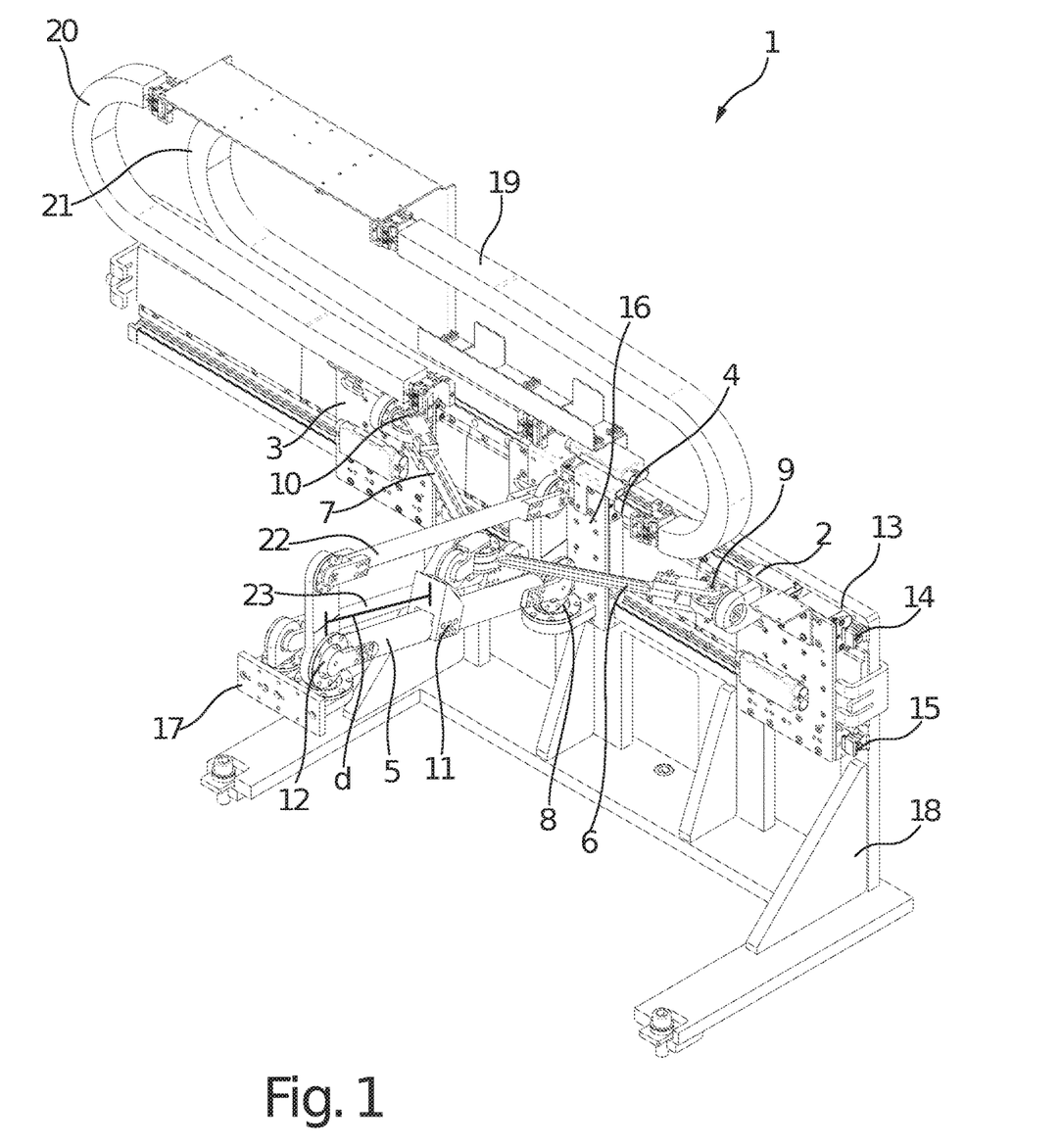
FIG. 1 is a perspective view of a first positioning unit.

FIG. 1 is a perspective view of a first positioning unit 1. Two control carriages 2, 3 and a work carriage 4 can be seen. On the work carriage 4, a working arm 5 is articulated on a work base point 8. On the control carriages 2 and 3, control arms 6, 7 are articulated on control base points 9, 10, respectively.

The control arms 6, 7 are additionally articulated on the working arm 5 at a control point 11. For this purpose, the control point 11 has a universal joint combined with a rotational joint.

The control point 11 is spaced apart from a working-point end 12 of the working arm 5 at a lambda distance d. The working-point end 12 corresponds to the end of the working arm 5 that is not articulated on the work carriage 4 or on the work base point 8. A work unit 17 can also be seen on the working-point end 12. The work carriage 4 is connected by means of the working arm 5 and joints that are torsionally stiff (about the y-axis) and preferably have zero clearance. Other joints of the positioning unit can be designed to have clearance. In this embodiment, the work unit 17 is designed as a holder on which a tool can be mounted. The control carriages 2, 3 and the work carriage 4 are movably arranged on a shared guiding means 13, in particular on the two guide rails 14, 15 thereof. The guiding means 13 is in turn mounted on a stand 18.

Energy supply means 19, 20, 21 supply current to the control carriages 2, 3 and the work carriage 4 or current-carrying motor parts of linear motors, which parts are provided on said carriages for driving same.

As a counterpart to the current-carrying motor parts, a currentless stator that extends over the entire guide rail 14 is integrated into the guide rail 14. The current-carrying motor parts and the currentless stator thus each form linear motors by means of which the control carriages 2, 3 and the work carriage 4 can be moved.

Furthermore, two support arms 22, 23 that are each articulated on a base plate 16 of the work carriage 4 and on the work unit 17 can also be seen.

Figure 2:
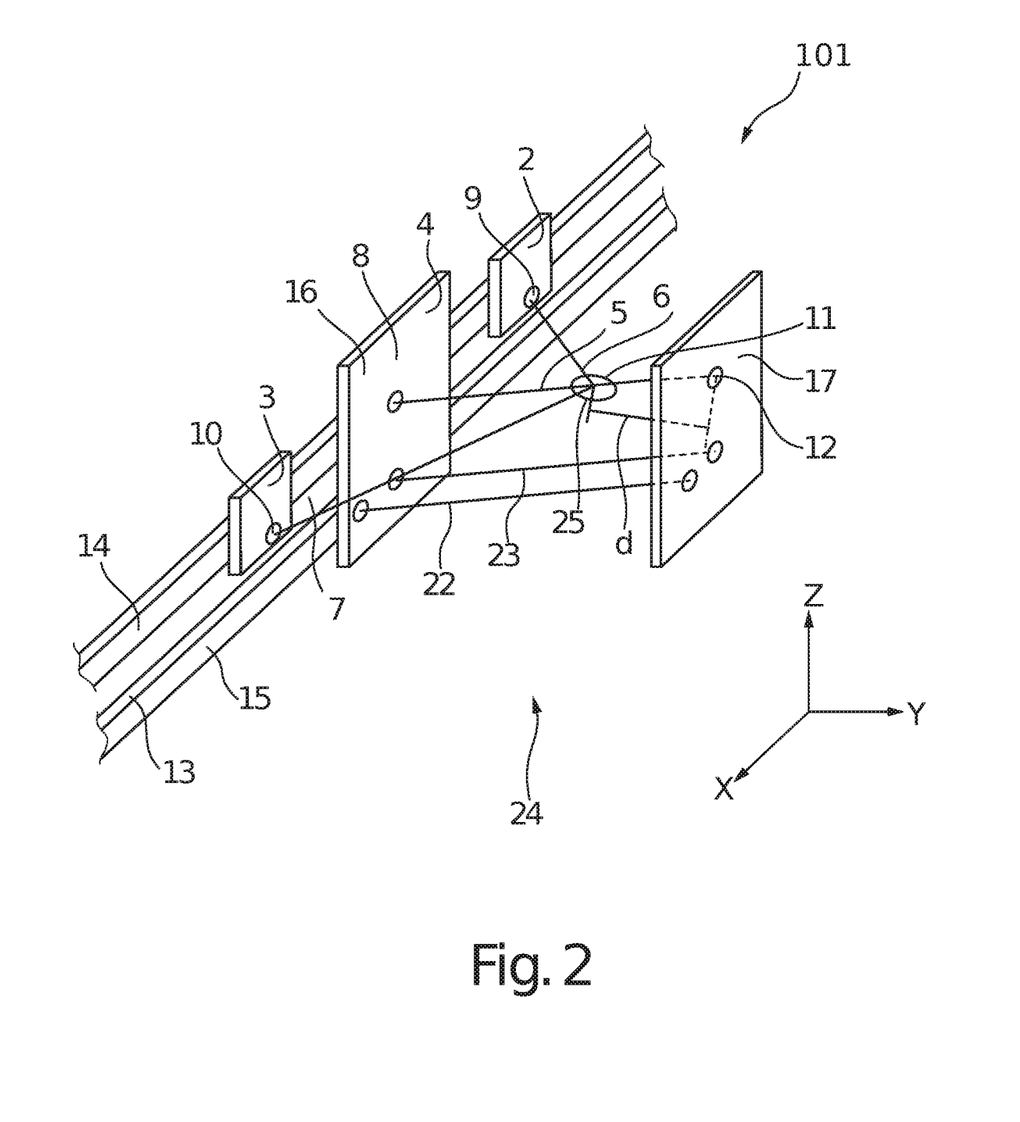
FIG. 2 is a schematic representation of a positioning unit that is assembled analogously to the positioning unit in FIG. 1.

FIG. 2 is a highly schematic representation of a positioning unit 101 that is assembled similarly to the positioning unit 1. The same reference signs as in FIG. 1 are therefore used for the elements that correspond to one another in each case.

FIG. 2 in particular shows the positioning unit 101 having the support arms 22, 23 that are articulated both on the base plate 16 and on the work unit 17. The positioning unit 101 differs from the positioning unit 1 (FIG. 1) in particular in that, in the positioning unit 101, the two support arms 22, 23 are arranged below the working arm 5.

The support arms 22, 23 form a parallelogram mechanism.

The support arms 22, 23 also form a parallelogram mechanism together with the working arm 5.

In this embodiment, the articulations are formed by joints.

In addition, FIG. 2 indicates that the work unit 17 is movable in three directions x, y, z. Thus, the positioning unit 101 forms a three-axis system.

In addition, the following three basic modes of movement can be combined with one another in order to move the work unit 17 in the x, y and/or z direction.

A first basic mode of movement results from the control carriages 2, 3 being moved in opposite directions, while the work carriage 4 remains unmoved. This leads to a movement of the working arm 5 in the manner of a crossing gate, as a result of which the work unit 17 moves on a circular path in the plane spanned by the y and z directions.

A second basic mode of movement results from the control carriages 2, 3 each being moved in the same direction relative to the work carriage 4. This allows the work unit 17 to be moved substantially—in particular at a correspondingly selected relative speed of the control carriages 2, 3 toward one another—in the plane spanned by the x and y directions.

A third basic mode of movement, which leads to an exclusive movement of the work unit 17 in the x direction, results from all three carriages, i.e. the control carriages 2, 3 and the work carriage 4, being moved along the guiding means 13 at the same speed.

By combining these three basic modes of movement, predefined positions within a working space 24 can therefore optionally be approached or reached by the work unit 17 or the working-point end 12.

The control point 11 is spaced apart from the working-point end 12 by the lambda distance d. By selecting the position of the control point 11 along the working arm 5 or by selecting the lambda distance d, the sensitivity with which the control movements of the control carriages 2, 3 lead to movements of the work unit 17 or the working-point end 12 can be set.

According to this embodiment, the working arm 5 additionally has a spindle thread (not shown in FIGS. 1 and 2 in more detail) in regions. The control point 11 has an adjusting element 25 having an internal thread, which can be moved along the spindle thread by being rotated.

Figure 3:
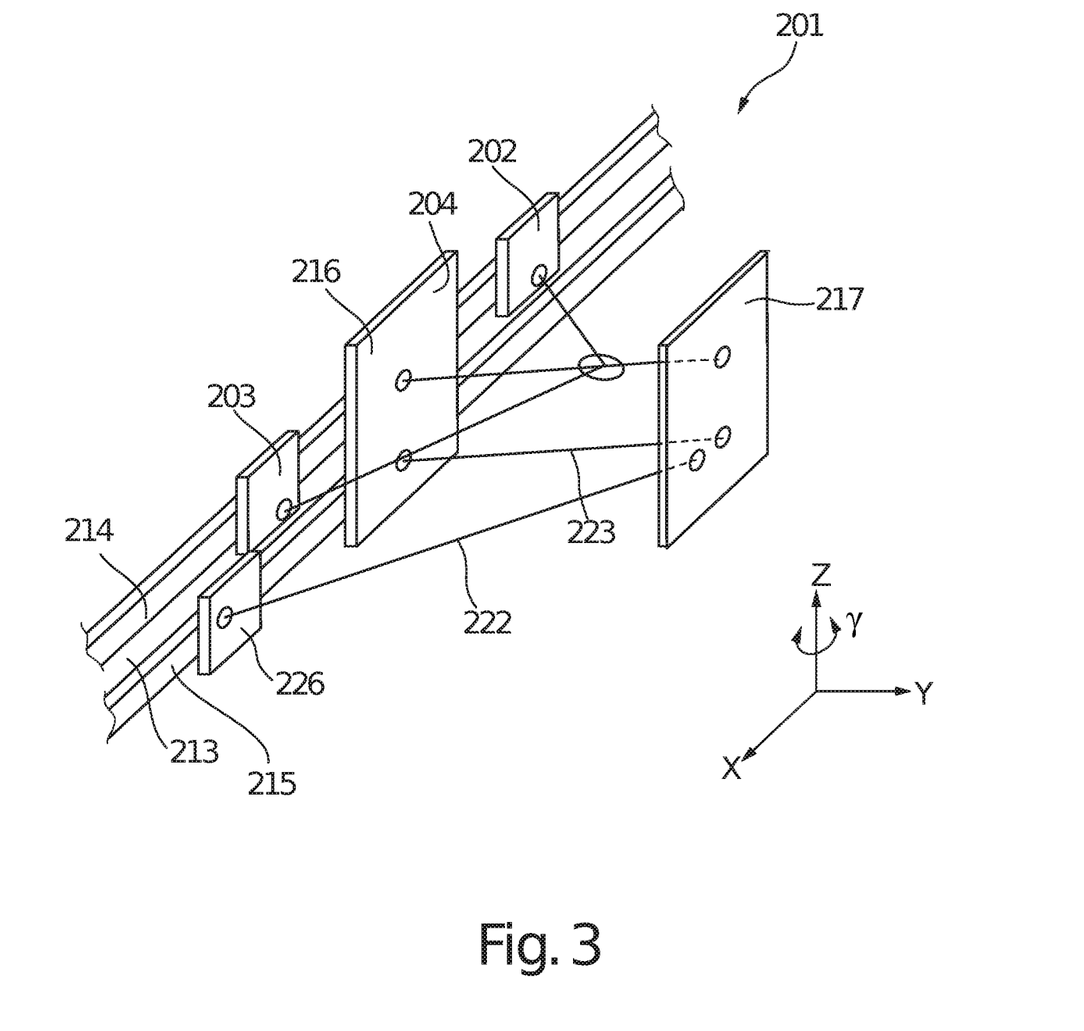
FIG. 3 is a schematic representation of a third positioning unit having four controllable axes.

FIG. 3 shows an additional positioning unit 201. The positioning unit 201 is assembled largely analogously to the positioning unit 101 in FIG. 2, and therefore only the particularities of the positioning unit 201 are described in the following.

The positioning unit 201 is a four-axis system. In addition to the movement of a work unit 217, which substantially corresponds to the work unit 17, in the x, y and/or z direction, the work unit 217 can also be pivoted about the z direction according to the rotational direction γ.

For this purpose, the positioning unit 201 has in turn two control carriages 202, 203 and two support arms 222, 223. However, in contrast with the embodiment in FIG. 2, only one of the two support arms, in particular the support arm 223, is supported on a base plate 216 of a work carriage 204 or is articulated thereon.

In contrast, the other support arm 222 is articulated on a support carriage 226. In this embodiment, the support arm 222 is articulated on both ends by means of ball-and-socket joints. The support carriage 226 is in turn movably arranged on a guiding means 213 comprising two guide rails 214, 215, in particular on the guide rail 215. The control carriages 202, 203 and the work carriage 204 are movably arranged on the shared guide rail 214.

In addition, the two support arms 222, 223 are articulated on the work unit 217. The two support arms 222, 223 therefore do not form a parallelogram mechanism in this case. Rather, the support carriage 226 can be moved relative to the work carriage 204, as a result of which the work unit 217 is pivoted according to the rotational direction γ or is rotated about the z direction.

Figure 4:
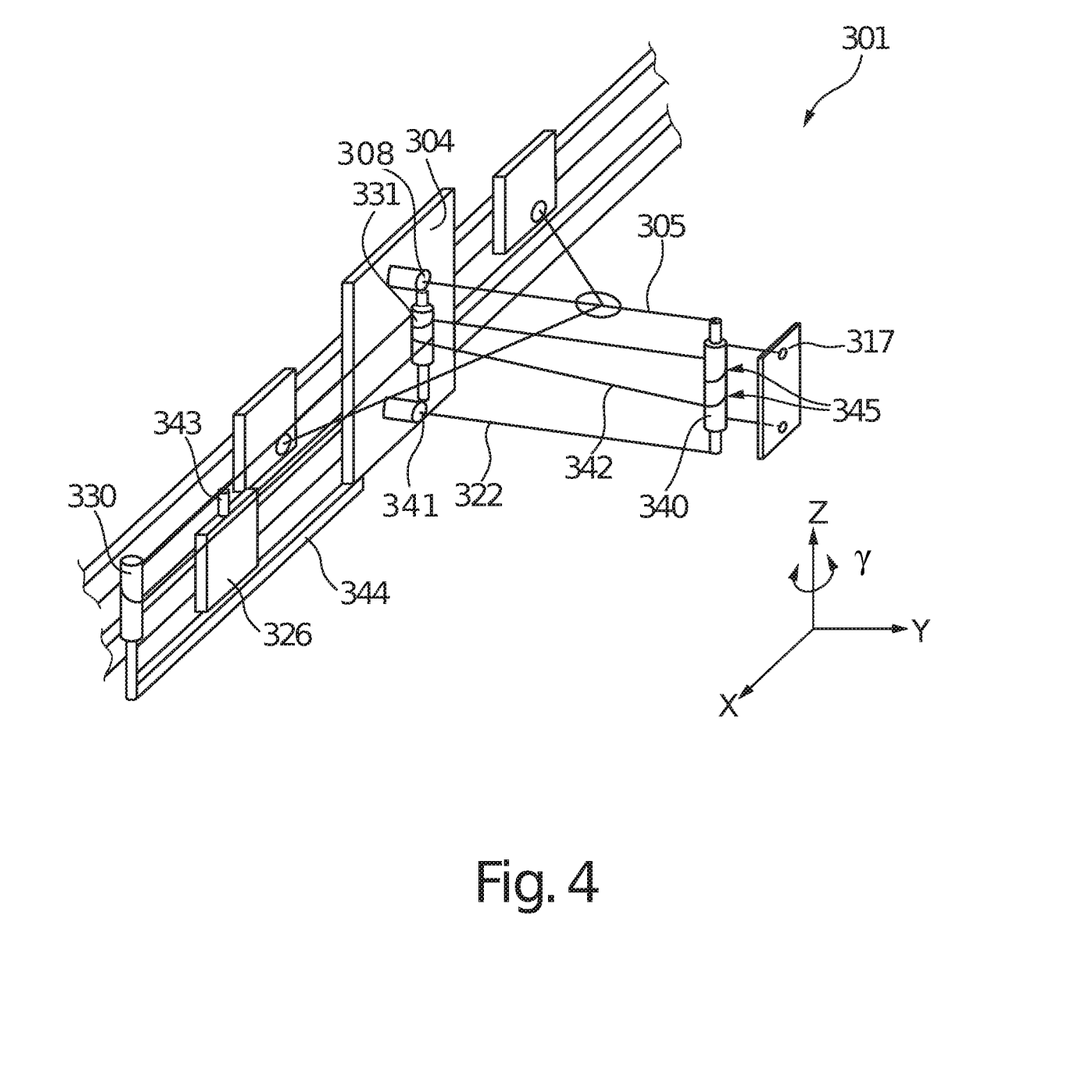
FIG. 4 is a schematic representation of a fourth positioning unit having four controllable axes.

FIG. 4 shows a positioning unit 301 as an additional embodiment. The positioning unit 301 is assembled as a four-axis system substantially analogously to the abovementioned positioning unit 201. However, in contrast with the positioning unit 201, the four axes are controlled according to the rotational direction γ by a wire rope mechanism. The substantial differences between the positioning units 201 and 301 are therefore described in the following for the purpose of understanding the mode of operation of the wire rope mechanism.

The positioning unit 301 has a work unit 317. The work unit 317 is articulated on a work carriage 304 by means of a pivot roller 340, a working arm 305 and a support arm 322.

For this purpose, the working arm 305 is articulated on a work base point 308 that is spaced apart from the work carriage 304. The support arm 322 is articulated on a support base point 341 that is also spaced apart from the work carriage 304.

The work unit 317 can be pivoted relative to the work carriage 304 according to the rotational direction γ, i.e. in the z direction, by means of the pivot roller 340. For this purpose, the pivot roller 340 is rotatably mounted between the working arm 305 and the support arm 322, and the work unit 317 is rigidly connected to the pivot roller 340.

A wire rope 342 circulates or loops around the pivot roller 340 in pivot roller grooves 345. Both ends of the wire rope 342 are fixed to the pivot roller 340, the wire rope 342 being preloaded for a precise course by means of a tensioning screw arranged on the pivot roller 340.

The pivot roller grooves 345 are used in particular to guide the wire rope 342 securely on the pivot roller 340, irrespective of the location or position of the work unit 317, and in particular to prevent the wire rope 342 from slipping. The number of loops of the wire rope 342 around the pivot roller 340 is selected on the basis of the desired maximum angular range of the rotation about the z axis. In this embodiment, the wire rope 342 loops once around the pivot roller 340.

The wire rope 342 is further guided away from the pivot roller 340 by means of a deflection roller 331, which is indirectly arranged on the work carriage 304 so as to be rotatable, and an additional deflection roller 330 and then, from here, back to the pivot roller 340 by means of the deflection roller 331. The deflection roller 331 also has grooves for guiding the wire rope 342.

The deflection roller 331 is rotatably fixed to the work base point 308 and the support base point 341.

The deflection roller 330 is rigidly connected to the work carriage 304 by means of a connecting rail 344, such that, when the work carriage 304 is moved, said rail is also moved.

A support carriage 326 is arranged between the deflection roller 330 and the work carriage 304 and, in particular, can be moved relative to the work carriage 304 and the deflection roller 330. The support carriage 326 has a rope fastener 343 by means of which the wire rope 342 is rigidly connected to the support carriage 326 at at least one point.

By moving the support carriage 326 relative to the work carriage 304 or the deflection roller 330, the wire rope 342 is thus moved by means of the rope fastener 343, as a result of which the pivot roller 340 is in turn controlled, in particular rotated. The work unit 317 is thus pivoted according to the rotational direction γ.

Therefore, a fourth axis can be controlled by the support carriage 326 also in this embodiment.

According to an alternative embodiment of the invention, it is conceived that the wire rope is guided only around the rotationally fixed deflection roller 331 and the pivot roller 340 and not by means of the deflection roller 330. The work unit 317 can thus alternatively be controlled according to a parallelogram mechanism in an easy and inexpensive way.

Figure 5:
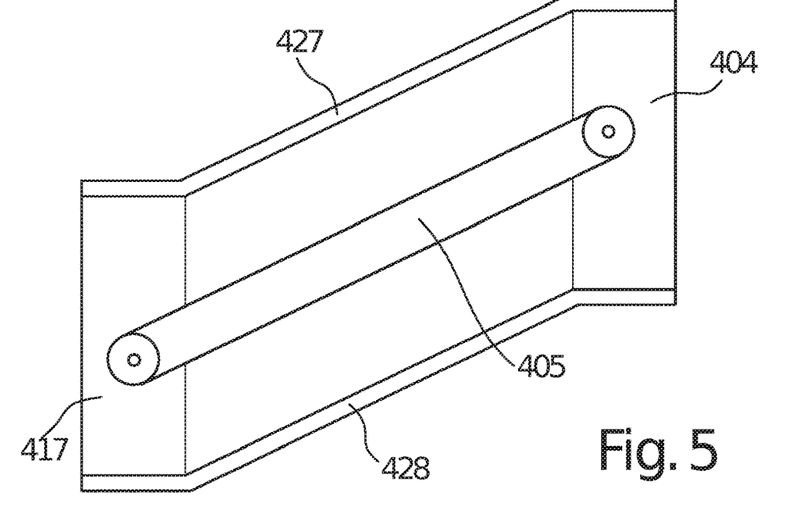
FIG. 5 is a schematic representation of a parallelogram mechanism formed by flexible tension elements.

The schematic representation in FIG. 5 shows an alternative embodiment of two support arms as flexible tension elements by means of which a parallelogram mechanism is formed.

Shown in a side view is a work carriage 404 that is connected to a work unit 417 by means of two spring steel strips 427, 428. The spring steel strips 427, 428 are made of resilient spring steel and form flexible tension elements. It can also be seen in FIG. 5 that a working arm 405 (that can be subjected to compression loading) is articulated on the work unit 417 and on the work carriage 404.

If the work unit 417 is moved relative to the work carriage 404 in the image plane of FIG. 5, the spring steel strips 427, 428 deform but maintain their tensile effect. A parallelogram mechanism is thus formed, allowing joints for the spring steel strips 427, 428 to be dispensed with.

Figure 6:
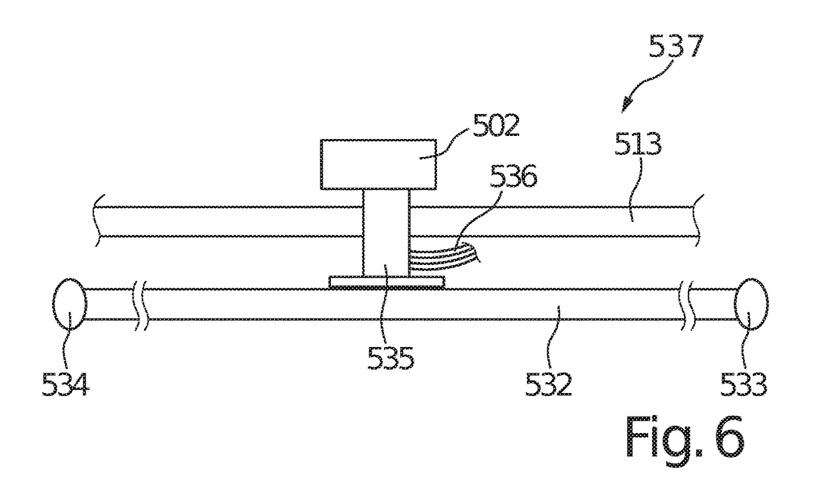
FIG. 6 is a schematic representation of an impulse decoupling unit.

FIG. 6 is a schematic representation of a design and mode of operation of an impulse decoupling unit 537 of a positioning unit.

A guiding means 513 can first be seen on which a carriage, in particular a control carriage 502, is movably arranged. A linear motor is provided for driving the control carriage 502. The linear motor is formed by a currentless stator 532 that has magnetic strips having regularly arranged magnetic regions of alternating directions of polarization, and a current-carrying motor part 535. The stator 532 and the current-carrying motor part 535 slide along one another and together form a linear motor.

The motor part 535 is supplied with current by an energy supply means 536.

The stator 532 is slidably mounted on the guiding means 513.

When the control carriage 502 accelerates, it is supported on the stator 532 in a frictional connection. The stator 532 is accelerated counter to the direction of acceleration of the control carriage 502 by means of the recoil impulse. Additional masses 533, 534 are provided in order to keep the absolute deflections of the stator 532 low. Said masses are substantially greater than, in particular a multiple of, the mass of the control carriage 502. Therefore, owing to the mobility of the stator 532, recoil impulses of the control carriage 502 or the masses arranged thereon accelerate the stator 532 along with the masses 533, 534 thereof. A stand (not shown in more detail in FIG. 6 for the sake of simplicity) supporting the positioning unit is thus relieved of the recoil impulses.

The control carriage 502 is shown by way of example for additional carriages, in particular for an additional control carriage and for a work carriage that are arranged so as to be movable along the stator 532 analogously to the carriage 502. Recoil impulses from a plurality of carriages can therefore be decoupled or respectively absorbed by the arrangement shown in FIG. 6.

In an alternative embodiment, the positioning unit additionally has a position measuring system for detecting the position of the stator 532. The position of the stator 532 is continuously detected or respectively monitored by said position measuring system, such that the current-carrying motor part 535 can be controlled in a manner aligned with the corresponding position of the magnetic strip or the position of the magnetic regions and the respective directions of polarization thereof.

Figure 7:
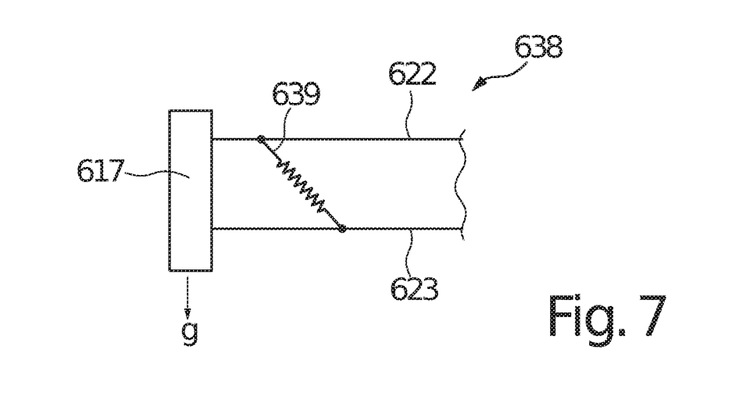
FIG. 7 is a schematic representation of a weight compensation unit.

FIG. 7 shows an embodiment of a weight compensation unit 638.

A work unit 617 can be seen in a side view. The mass of the work unit 617 causes a weight force that is directed in the direction of gravity g. Said weight force should be compensated for in order to achieve a highly dynamic positioning system and relieve the strain on the respective drives.

The mode of operation of the compensation unit 638 is explained by way of example on the basis of two support arms 622, 623 that form a parallelogram mechanism. It can be seen that a compensation element 639 is arranged between the support arms 622, 623. In this embodiment, the compensation element 639 is designed as a compression spring.

In an alternative embodiment, the compensation element 639 is formed by spiral springs in the articulations. In an additional alternative embodiment, the compensation element 639 is designed as a pneumatic piston.

If the work unit 617 is therefore moved along the image plane, i.e. in or counter to the direction of gravity g, and therefore out of a zero position, the compensation element 639 is tensioned. The compensation element 639 therefore works against a deflection of the work unit 617 out of the zero position thereof in each case. Preloading the compensation element 639 in particular allows the work unit 617 to be located in the region of the zero position thereof when in the idle state. In the case of the alternative embodiment as a pneumatic piston, a balancing force that is adapted to the mass to be compensated for is hydraulically produced by means of pressure regulation.

The weight of the work unit 617 is thus at least partially compensated for by the compensation element 639. In addition, it can therefore also be ensured that the work unit 617 is moved back at least toward the zero position thereof in an emergency-stop situation.

LIST OF REFERENCE SIGNS

1, 101, 201, 301 positioning unit
2, 3, 202, 203, 502 control carriage
4, 204, 304, 404 work carriage
5, 305, 405 working arm
6, 7 control arm
8, 308 work base point
9, 10 control base point
11 control point
12 working-point end
13, 213, 513 guiding means
14, 15, 214, 215 guide rail
16, 216 base plate
17, 217, 317, 417, 617 work unit
18 stand
19, 20, 21, 536 energy supply means
22, 23, 222, 223, 322, 622, 623 support arm
24 working space
25 adjusting element
226, 326 support carriage
427, 428 spring steel strip
330, 331 deflection roller
532 stator
533, 534 mass
535 motor part
537 impulse decoupling unit
638 weight compensation unit
639 compensation element
340 pivot roller
341 support base point
342 wire rope
343 rope fastener
344 connecting rail
345 pivot roller groove
d lambda distance
x, y, z directions
γ rotational direction
g direction of gravity

The invention claimed is:

1. A positioning unit (1, 101, 201, 301) comprising two control carriages (2, 3, 202, 203, 502) and a work carriage (4, 204, 304, 404),
   the two control carriages (2, 3, 202, 203, 502) and the work carriage (4, 204, 304, 404) being configured to be movable on tracks that extend in parallel with one another,
   a working arm (5, 305, 405) being articulated on a work base point (8, 308) on the work carriage (4, 204, 304, 404) and a control arm (6, 7) being articulated on a control base point (9, 10) on each of the control carriages (2, 3, 202, 203, 502),
   the control arms (6, 7) being articulated on the working arm (5, 305, 405) at a control point (11) of said working arm, the control point (11) being spaced apart at a predefined lambda distance (d) from an end of the working arm (5, 305, 405) that forms a working-point end (12) and faces away from the work base point (8, 308), and
   the two control base points (9, 10) and the work base point (8, 308) defining a triangle,
   wherein
   at least two carriages of the two control carriages (2, 3, 202, 203, 502) and the work carriage (4, 204, 304, 404) are movably arranged on a shared guide (13, 213, 513).

2. The positioning unit according to claim 1, wherein the work base point (8, 308) is arranged on a base plate (16, 216) of the work carriage (4, 204, 304, 404).

3. The positioning unit according to claim 1, wherein a work unit (17, 217, 317, 417, 617) is arranged at the working-point end (12) of the working arm (5, 305, 405).

4. The positioning unit according to claim 1, wherein a support arm (22, 23, 222, 223, 322, 622, 623), that is supported at least indirectly on the guide (13, 213, 513) is connected to the working-point end (12) of the working arm (5, 305, 405) and/or a work unit (17, 217, 317, 417, 617) arranged at the working-point end (12) of the working arm (5, 305, 405).

5. The positioning unit according to claim 1, wherein a first and/or a second support arm (22, 23, 222, 223, 322, 622, 623) form a parallelogram mechanism together with the working arm (5).

6. The positioning unit according to claim 4, wherein the support arm (22, 23, 222, 223, 322, 622, 623) is arranged so as to be movable relative to at least one other carriage.

7. The positioning unit according to claim 1, wherein the support arm (22, 23, 222, 223, 322, 622, 623) is a flexible tension element.

8. The positioning unit according to claim 1, wherein at least two of the carriages are arranged on a base carriage, the at least two carriages being movable relative to one another.

9. The positioning unit according to claim 1, wherein the positioning unit (1, 101, 201, 301) has an impulse decoupling unit (537), for decoupling or respectively compensating for a recoil impulse.

10. The positioning unit according to claim 1, wherein the positioning unit (1, 101, 201, 301) has a weight compensation unit (638).

11. The positioning unit according to claim 1, wherein at least one articulation is formed by means of a preloaded bearing.

12. The positioning unit according to claim 1, wherein at least one of the carriages is movable by means of a linear motor, a current-carrying motor part (535) of the linear motor being arranged on the carriage.

13. The positioning unit according to claim 1, wherein at least two of the carriages share a component of the positioning unit.

14. The positioning unit according to claim 1, wherein the positioning unit (1, 101, 201, 301) has a control unit that is a computer unit and is configured to move the control (2, 3, 202, 203, 502) and/or the work carriages (4, 204, 304, 404) along the guide (13, 213, 513) such that the working-point end (12) reaches a predefinable spatial position within a working space (24) of the positioning unit (1, 101, 201, 301).

* * * * *